(12) United States Patent
Bechini

(10) Patent No.: US 12,441,501 B2
(45) Date of Patent: Oct. 14, 2025

(54) DEVICE FOR MOVING CONTAINERS, AN APPARATUS AND A METHOD FOR PRODUCING PHARMACEUTICAL OR BIOTECHNOLOGICAL ARTICLES

(71) Applicant: PHARMA INTEGRATION S.R.L., Siena (IT)

(72) Inventor: Claudio Bechini, Siena (IT)

(73) Assignee: Pharma Integration S.R.L. (IT)

( * ) Notice: Subject to any disclaimer, the term of this patent is extended or adjusted under 35 U.S.C. 154(b) by 138 days.

(21) Appl. No.: 18/270,932

(22) PCT Filed: Jan. 11, 2022

(86) PCT No.: PCT/IB2022/050181
§ 371 (c)(1),
(2) Date: Jul. 5, 2023

(87) PCT Pub. No.: WO2022/149115
PCT Pub. Date: Jul. 14, 2022

(65) Prior Publication Data
US 2024/0059443 A1  Feb. 22, 2024

(30) Foreign Application Priority Data

Jan. 11, 2021  (IT) .................. 102021000000311

(51) Int. Cl.
*B65B 3/00*     (2006.01)
*B01J 19/00*    (2006.01)
(Continued)

(52) U.S. Cl.
CPC ............ *B65B 43/46* (2013.01); *B01J 19/004* (2013.01); *B25J 21/005* (2013.01); *B65B 3/003* (2013.01);
(Continued)

(58) Field of Classification Search
CPC ......... B65B 3/003; B65B 31/00; B65B 43/42; B65B 43/46; B65B 55/027; B65G 29/00;
(Continued)

(56) References Cited

U.S. PATENT DOCUMENTS 1,827,553 A * 10/1931 Algeo et al. ............ C03B 35/06
                                                           134/67
3,232,446 A *  2/1966 Spurr et al. .......... B65G 47/904
                                                           414/733
(Continued)

FOREIGN PATENT DOCUMENTS

EP          1447328 B1     2/2007
WO      WO01/76850 A1    10/2001
(Continued)

OTHER PUBLICATIONS

Technical Committee : ISO/TC 209 Cleanrooms and associated controlled environments; ICS 13.040.35 Cleanrooms and associated controlled environments; Dec. 2015.

*Primary Examiner* — Stephen F. Gerrity
(74) *Attorney, Agent, or Firm* — Endurance Law Group PLC

(57) ABSTRACT

A device for moving a group of containers for pharmaceutical or biotechnological use, between chambers with a controlled atmosphere comprising a support structure, supports configured to accommodate containers with an exposed part, a guide for guiding the supports, rotationally coupled to the support structure, first rotating means of the guide and movement means of the supports along the guide. The guide rotates to locate the exposed parts of the containers in one of the chambers and the movement means vary the distances between the supports, preferably by means of a main body which is rotationally coupled to the guide and which comprises an external surface on which tracks are formed. An apparatus and a method for producing pharma- (Continued)

ceutical or biotechnological articles are provided, involving the movement of containers between chambers with a controlled atmosphere.

17 Claims, 14 Drawing Sheets

(51) Int. Cl.
*B25J 21/00* (2006.01)
*B65B 31/00* (2006.01)
*B65B 43/42* (2006.01)
*B65B 43/46* (2006.01)
*B65B 55/02* (2006.01)
*B65G 47/90* (2006.01)

(52) U.S. Cl.
CPC .............. *B65B 31/00* (2013.01); *B65B 43/42* (2013.01); *B65B 55/027* (2013.01); *B65G 47/90* (2013.01)

(58) Field of Classification Search
CPC ...... B65G 29/02; B65G 47/90; B65G 47/904; B65G 47/907; B65G 47/962; B25J 15/0052; B25J 21/005; B01J 19/004
USPC .................. 53/250, 251, 253; 141/129, 168; 198/468.3; 414/753.1, 222.07
See application file for complete search history.

(56) References Cited

U.S. PATENT DOCUMENTS

| | | | |
|---|---|---|---|
| 3,580,442 A | | 5/1971 | Rohdin et al. |
| 6,068,317 A | * | 5/2000 | Park ..................... H01L 21/68 414/752.1 |
| 6,733,224 B1 | * | 5/2004 | Linner ................... B65B 43/46 294/93 |
| 8,033,381 B2 | | 10/2011 | Konstandin et al. |
| 10,351,357 B1 | * | 7/2019 | Grovijohn et al. .. B65G 47/914 |
| 2005/0126115 A1 | * | 6/2005 | Battisti ................... B65B 35/54 53/53 |
| 2011/0067781 A1 | * | 3/2011 | Osborne ................ B65B 3/003 141/37 |
| 2014/0157731 A1 | * | 6/2014 | Perazzo et al. ......... B65B 3/003 141/2 |
| 2018/0339796 A1 | * | 11/2018 | Bai et al. ................ B65B 3/003 |
| 2019/0119621 A1 | * | 4/2019 | Koike et al. ........... B25J 21/005 |
| 2019/0202645 A1 | | 7/2019 | Slurink |
| 2019/0315004 A1 | * | 10/2019 | Bechini et al. ........ B25J 21/005 |

FOREIGN PATENT DOCUMENTS

| | | |
|---|---|---|
| WO | WO2016/198391 A1 | 12/2016 |
| WO | WO 2020/233881 A1 | 11/2020 |

\* cited by examiner

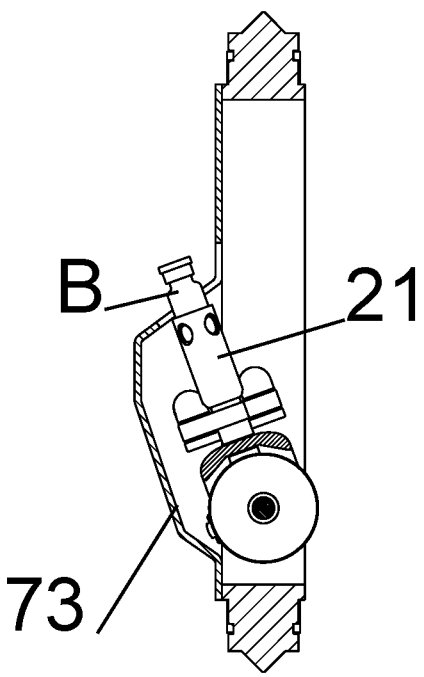
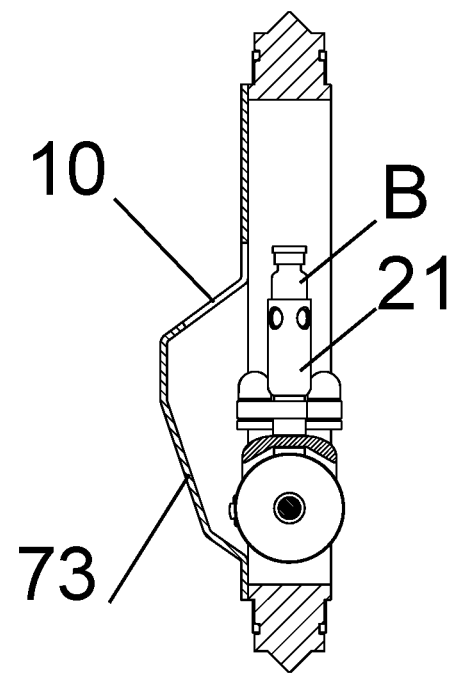
FIG. 19    FIG. 20
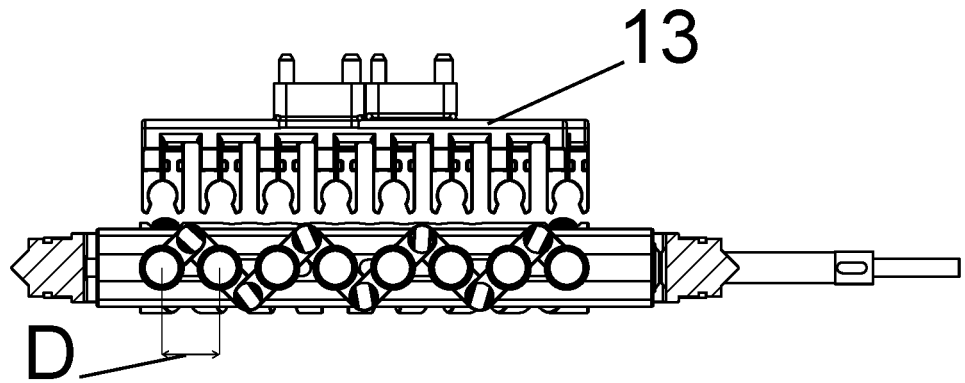
FIG. 21
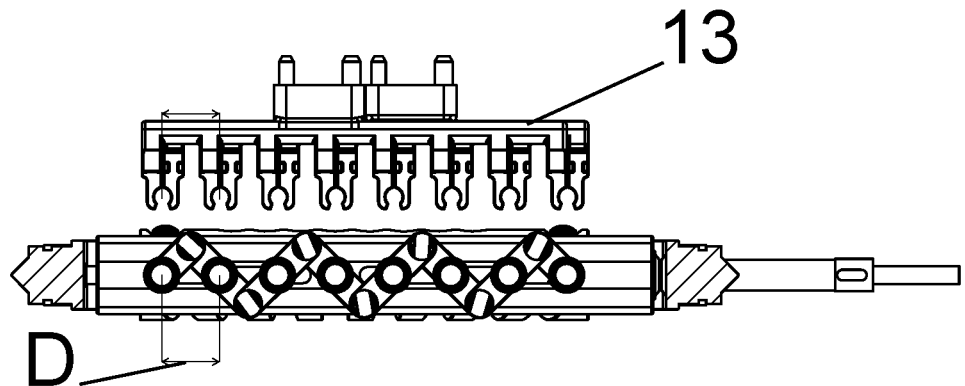
FIG. 22

DEVICE FOR MOVING CONTAINERS, AN APPARATUS AND A METHOD FOR PRODUCING PHARMACEUTICAL OR BIOTECHNOLOGICAL ARTICLES

FIELD OF THE INVENTION

The present invention concerns the production processes, typically pharmaceutical or biotechnological, which require a plurality of chambers with controlled atmospheres and, in particular, relates to the passage of containers between the chambers.

In greater detail, the invention relates to a device for moving containers and to an apparatus and a method for producing pharmaceutical or biotechnological articles.

DESCRIPTION OF THE PRIOR ART

In production processes there is a perceived need to decisively delimit contiguous chambers with controlled and possibly sterile atmospheres. This need is especially recognised in the production of pharmaceutical or biotechnological articles, particularly in the filling and closing processes of the containers. An example of these processes is described in EP 1447328 B1.

Typically these productions take place internally of cleanrooms, or clean areas, which are designed, maintained and controlled so as to prevent particle contamination of the articles. By way of example, standard ISO 14644-1, as well as European good manufacturing practice, includes a classification of cleanrooms. The passage of the containers becomes even more critical between chambers having an different pharmaceutical environment classification.

At present, in cleanrooms, the control of the atmosphere is done by injecting filtered air, for example using HEPA filters. It is specified that, using the common terminology in the reference technical sector, in the present patent application the term "air" is not limited to a particular mixture, for example the mixtures can be equally identified as ambient air or nitrogen.

Not respecting the border between the chambers can lead to grave consequences; for example it determines a qualitative risk to the articles due to cross-contamination, which might lead to damage to the final user or give rise to the return of whole batches.

The transfer of containers between the chambers represents one of the most critical operations, especially in the case of primary containers for pharmaceutical or biotechnological articles, as the transfer apparatuses cross the delimitation between the chambers together with the containers. In fact traditional transfer apparatuses such as, for example, belts, transporter, conveyors, rotating platforms or trays move from one chamber to another. To add to this, robotic systems invade the adjacent chamber, at least with the end effector. The use of like apparatuses is especially critical in the case of highly toxic substances or progressively more compact production lines in which the distances between the various components are reduced.

They are smaller by so much that the tendency to limit the dimensions of pharmaceutical or biotechnological production lines clashes with the demand for greater flexibility in terms of possibility of processing containers that are different in shape, dimensions and/or reciprocal positioning internally of the trays or crates or other types of receptacles. It is in fact necessary to complete preliminary operations so as to structure the production line and/or size change operations at the start and end of the line, with an increase in the risks of cross-contamination and the need to define proper operating spaces.

Flexibility, smaller sizes and clear delimitations between the chambers are key elements of production lines for small batches. These production processes progressively often take place internally of isolators arranged to form a production line. An example of an isolator for automated production of pharmaceutical or biotechnological articles is described in US 2019315004 A1.

SUMMARY OF THE INVENTION

A first aim of the present invention is to provide a device which enables moving a group of containers for pharmaceutical or biotechnological use between distinct chambers, limiting or eliminating the risk of cross-contamination.

A second aim is to provide a device, as well as an apparatus, for production of pharmaceutical or biotechnological articles, which is compact, when considering the results obtained with it, and can operate with groups of containers having different shapes and dimensions and with containers arranged differently.

A still further aim is to provide a method for producing pharmaceutical or biotechnological articles which limits or eliminates the risk of cross-contamination.

These and other aims, which will be obvious to the expert in the sector from a reading of the following text, are attained by means of a device for moving a group of containers for pharmaceutical or biotechnological use, of an apparatus for automated production of pharmaceutical or biotechnological articles and of a method for producing pharmaceutical or biotechnological articles according to the claims.

In accordance with the disclosure of the present document, the device comprises a support structure, supports, a guide, first rotating means of the guide and displacing means. Each of the supports comprises a support part configured to accommodate a container with a part exposed so that it can be picked up by transport means of the containers. The guide is configured to guide the supports and is rotationally coupled to the support structure so as to rotate between a first position and a second position. Further, the guide receives the supports orientated in such a way that the support parts are facing towards a first zone in the first position and towards a second zone in the second position, so as to locate, at least partially, the exposed part of each of the containers respectively in one of two chambers having controlled atmospheres. Movement means are advantageously configured to move the supports along the guide so as to vary the distances between the supports according to the direction of the axis of rotation.

The device is advantageously applied in an apparatus with a first chamber with a first controlled atmosphere and a second chamber with a second controlled atmosphere. The teachings of the invention also relate to a method for producing pharmaceutical or biotechnological articles comprises steps for moving containers between chambers of an apparatus.

BRIEF DESCRIPTION OF THE DRAWINGS

Specific embodiments of the invention will be described in the following part of the present description, according to what is set down in the claims and with the aid of the accompanying drawings, in which:

FIGS. 19 and 20 are section views, with respect to a plane passing through the opening of the chambers, of the device of FIG. 17 with some elements not included and with the pickup position of FIG. 20 different with respect to the position of FIG. 18;

FIGS. 21 and 22 are section views from above of the of the embodiment di FIG. 1, with some elements not included, in which different end effectors of a robotic system can be observed.

DESCRIPTION OF THE PREFERRED EMBODIMENTS

Figure 1:
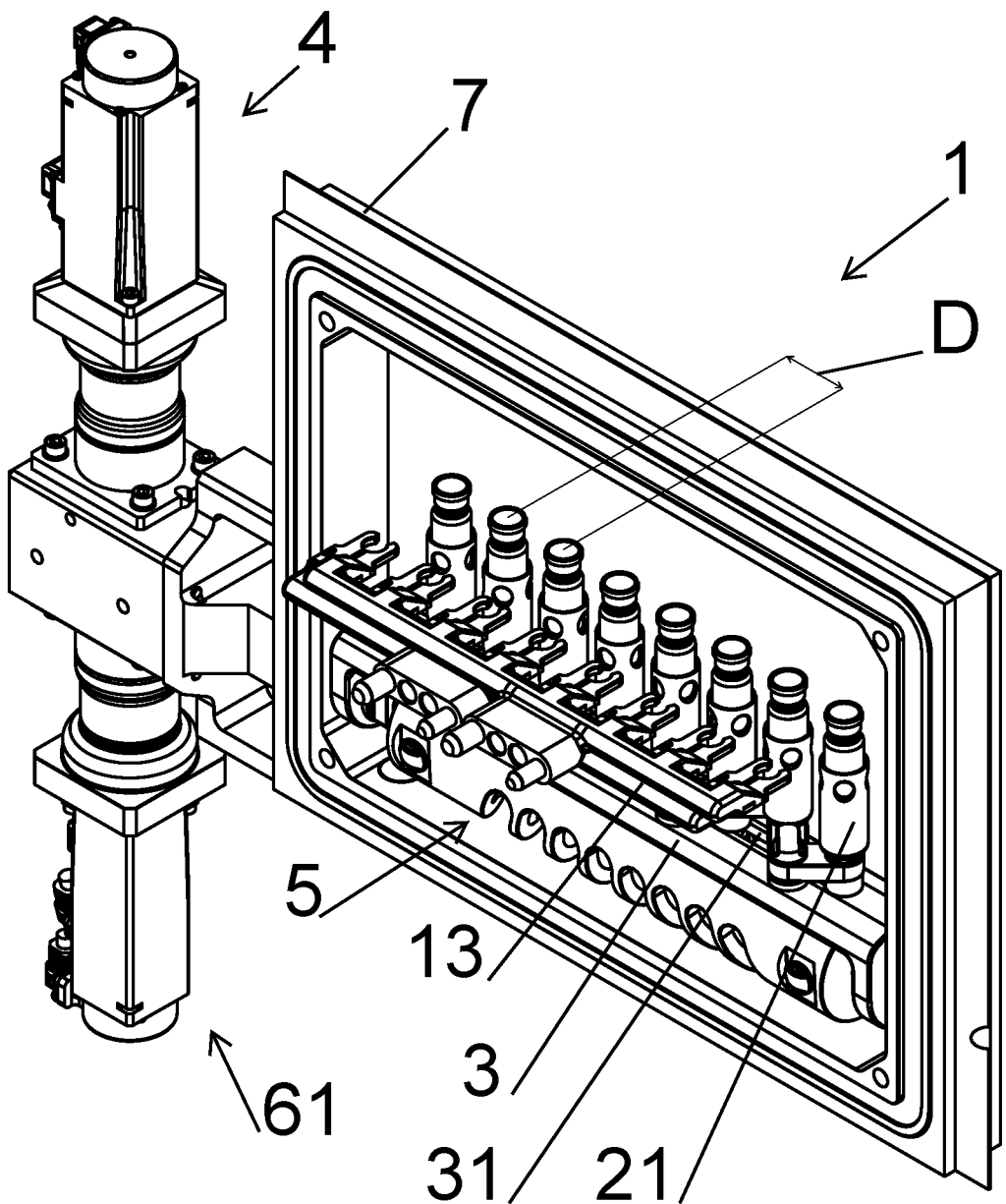
FIG. 1 is a perspective view of an embodiment of a device for moving a group of containers for pharmaceutical or biotechnological use according to the invention, in which an end effector of a robotic system can be observed.

With reference to the appended drawings, reference numeral (1) denotes a device for moving a group of containers (A) for pharmaceutical or biotechnological use, between a first chamber (11) with a first controlled atmosphere and a second chamber (12) with a second controlled atmosphere in at least one of which transport means (13,14) of the containers (A) operate. Generally the containers (A) are primary containers and they are usually a device (1) of an apparatus (100) for automated production of pharmaceutical or biotechnological articles in which often the first chamber (11) and the second chamber (12) are connected by an opening (10), very often of a limited size.

By way of example, the containers (A) can be vials, bottles, syringes or cartridges or, less often, a combination thereof.

By a controlled-atmosphere chamber is meant a chamber controlled at least in the sense of particles, such as for example indicated in standard ISO 14644-1. Generally the first chamber (11) and the second chamber (12) are chambers with different qualities of air cleanliness.

An embodiment of this device (1) comprises a support structure (7), supports (2), a guide (3), first rotating means (4) an displacing means (5).

Each of the supports (2) comprises a support part (21) configured to accommodate a container (A) with a part exposed (B) towards the surrounding environment, so that it can be picked up by transport means (13, 14) of the containers (A).

Figure 18:
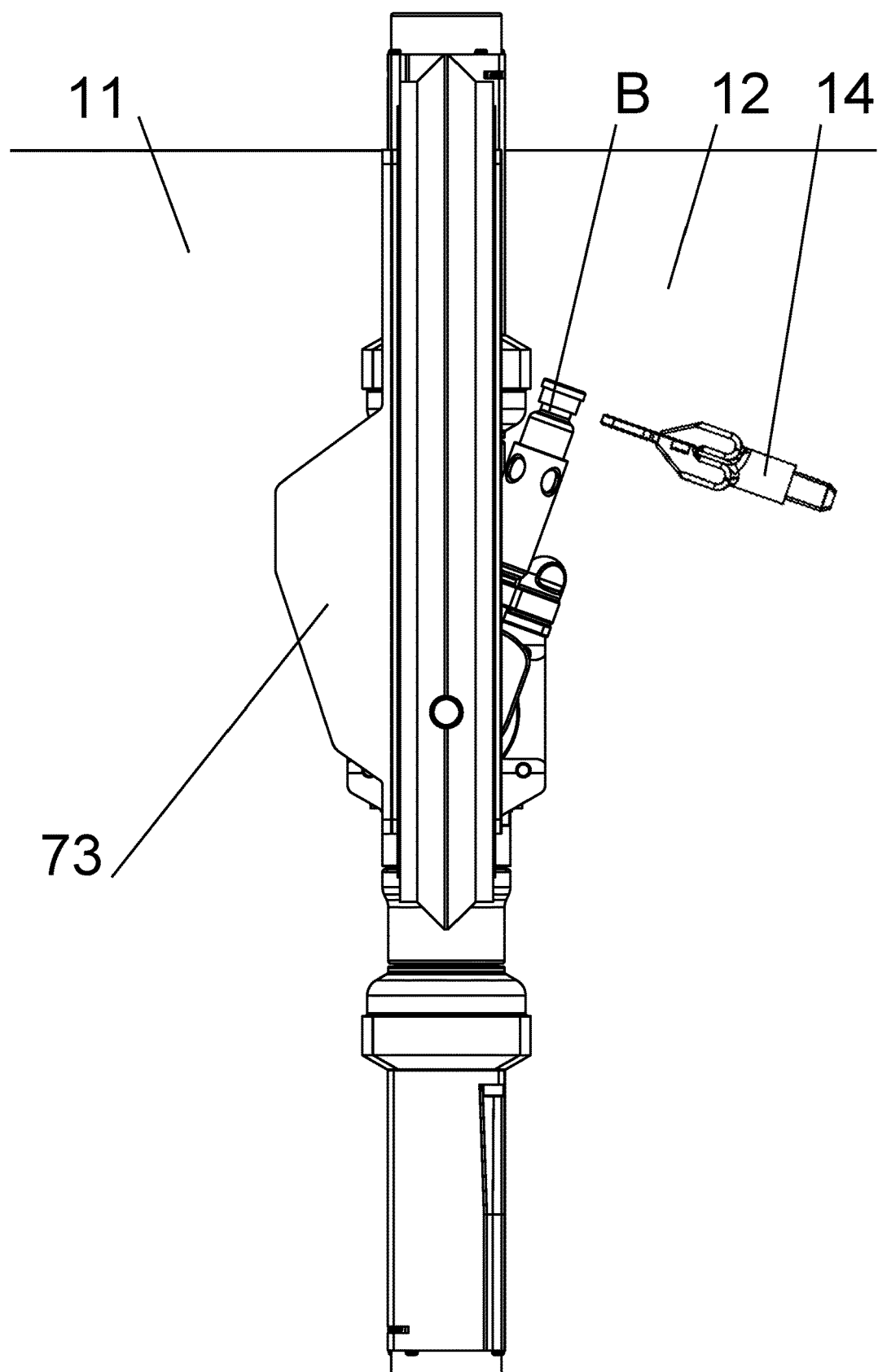

The guide (3) is configured to guide the supports (2) and is rotationally coupled to the support structure (7), with respect to an axis of rotation (X), so as to rotate between a first position and a second position. The first rotating means (4) are configured to rotate the guide (3) with respect to the axis of rotation (X) between the first position and the second position. Generally, the first rotating means (4) enable the complete rotation of the guide (3), so as to enable definition of the first position and the second position on the basis of the geometric characteristics of the installation and the specific needs of the production line. This is observed, for example, in the comparison between the pickup positions of FIG. 18 and FIG. 20.

The guide (3) accommodates the supports (2) orientated in such a way that the support parts (21) are facing towards a first zone in the first position and towards a second zone in the second position so as to locate, at least partially, the exposed part (B) of each of the containers respectively in the first chamber (11) and in the second chamber (12).

The movement means (5) are advantageously configured to move the supports (2) along the guide (3) so as to vary the distances (D) between the supports according to the direction of the axis of rotation (X).

The device (1) of the invention enables limiting or excluding risks of cross-contamination in the passage of the containers (A) between the first chamber (11) and the second chamber (12) taking, or receiving, at least one part of the exposed part (B) of each container (A) internally of the chamber (11, 12) so as to be able to be picked up, or deposited, without the transport means (13, 14) of the containers (A) invading the other chamber (12, 11).

Further the device (1) enables varying the distances (D) between containers (A) during the passage between the first chamber (11) and the second chamber (12) so as to provide high flexibility in a context where there is a reduced risk of cross-contamination and without substantially impacting on the size of the production line or of the machine where the device (1) is installed. The production line or the machine is thus able to process groups of containers (A) which have distances (D) between them within a range of values. For example, as will be illustrated more fully in the following, with the device (1) a production line can operate starting from nests with different pitches providing only suitable transport means (13) in a first chamber and without performing the size change in all the chambers.

In FIG. 1 a preferred embodiment is illustrated in which the guide (3) is of a linear type, with the guide direction arranged according to the direction of the axis of rotation (X), and the supports (2) are all maintained perpendicular to the guide (3). This configuration reflects the typical configuration of the containers (A) in the gripping organs of the transport means (13, 14) and simplifies the interaction between the supports (2) and the movement means (5).

Figure 2:
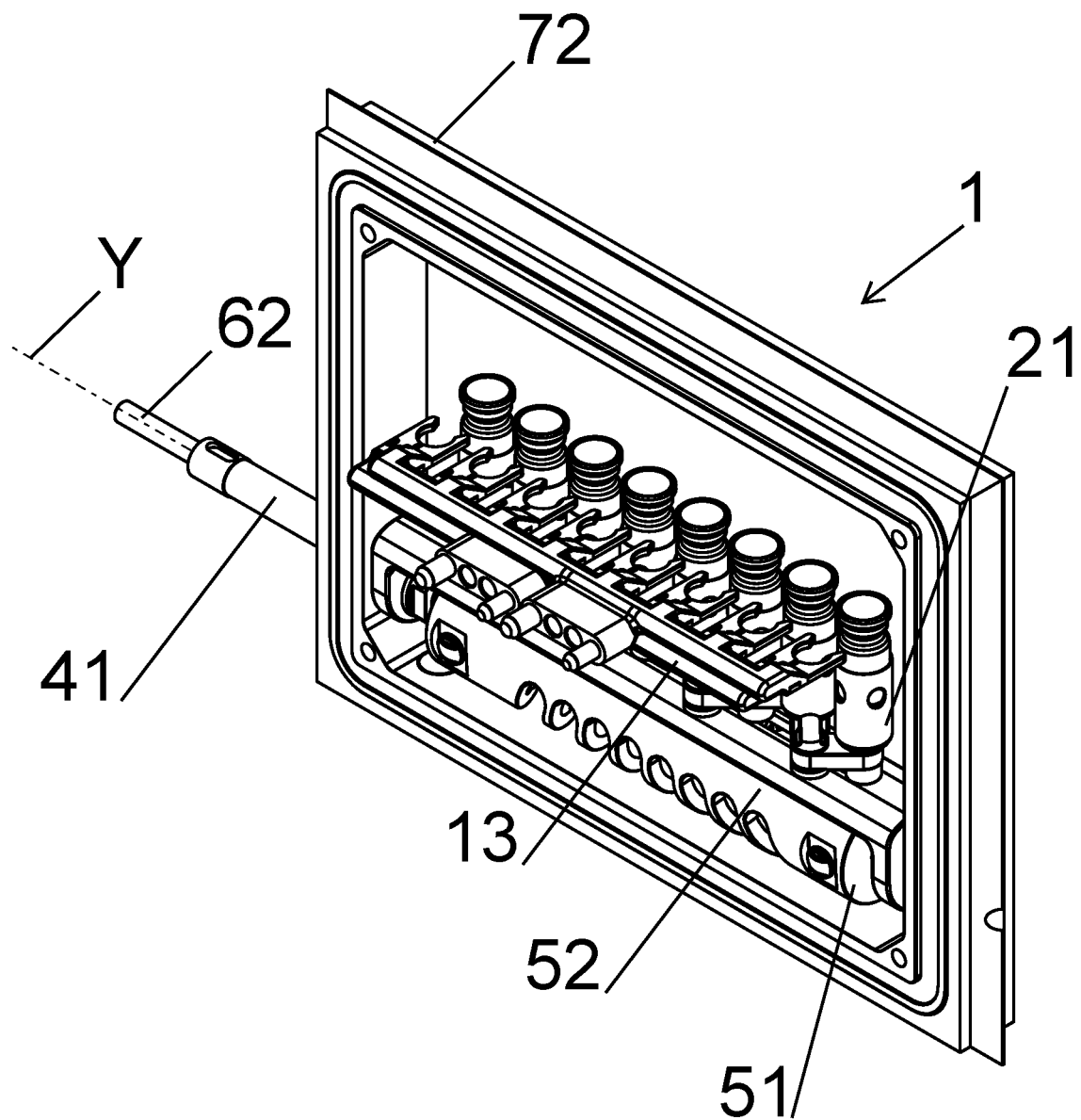
FIG. 2 is a perspective view of the embodiment di FIG. 1, suitable for different containers, with some elements not included.
Figure 3:
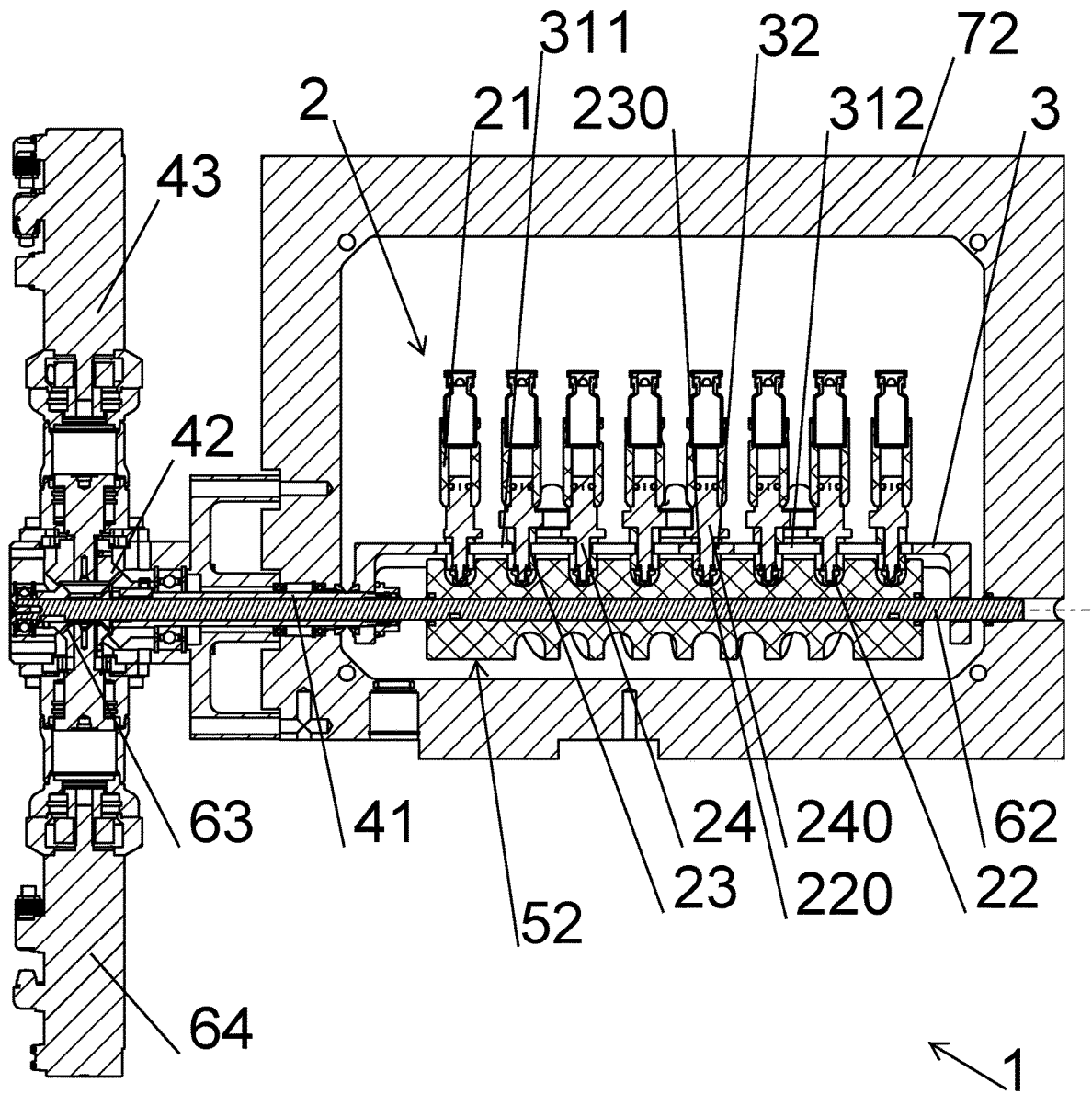
FIG. 3 is a sectional view, according to a plane passing through the axis of rotation, of the embodiment of FIG. 1.

The support parts (21) preferably comprise a part shaped as a basin or beaker to support and retain the containers (A) during the rotation of the guide (3). In the embodiments of the appended drawings, beakers can be seen having dimensions suited to the containers (A) and, as can be seen especially in FIGS. 1 to 3, are interchangeable. In particular the illustrated beakers have an inner diameter close to the outer diameter of the containers (A) at a height such as to leave an exposed part (B) of the containers (A) exposed.

In the same figures, in which the embodiment comprises axial symmetric beakers with respect to an axis of symmetry thereof and a guide (3) of a linear type, it can be seen how the supports (2) are orientated with the inlet sections to the basin-shaped part all facing in the same direction.

Although the guide (3) can be variously conformed, taking account of the need for orientation and displacement of the containers (A), the guide (3) is preferably a linear guide and more preferably is configured to guide the supports (2) according to the direction of the axis of rotation (X). The containers (A) are therefore easily pickable or renderable to groups in the supports (2) aligned in this way.

In the embodiments of the figures the axis of rotation (X) is horizontal, but this is not strictly necessary as the same effects would be obtained, for example, also by rotating the device (1) by ninety sexagesimal degrees, i.e. with the axis of rotation (X) vertical.

Figure 4:
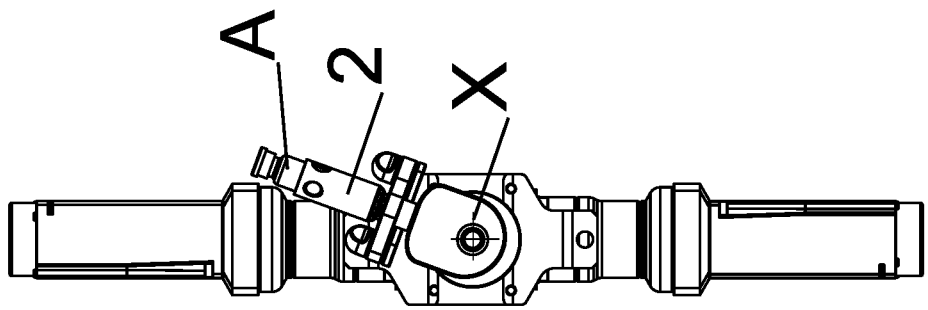
FIGS. 4 to 6 illustrate lateral views of successive operating moments of the embodiment di FIG. 1 with some elements not included.
Figure 5:
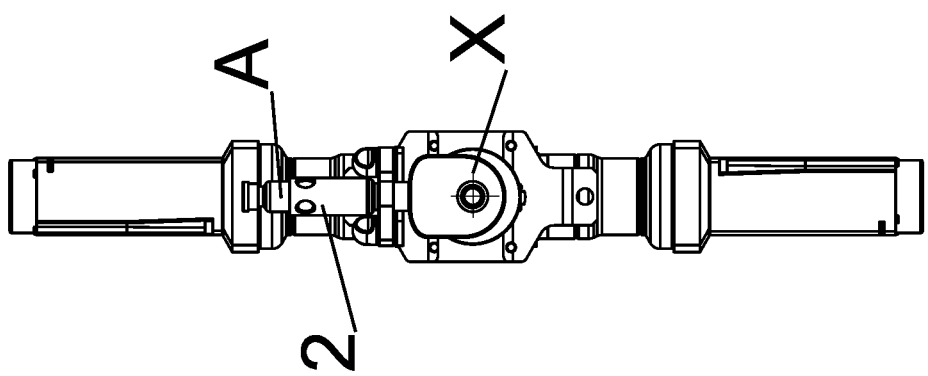
Figure 6:
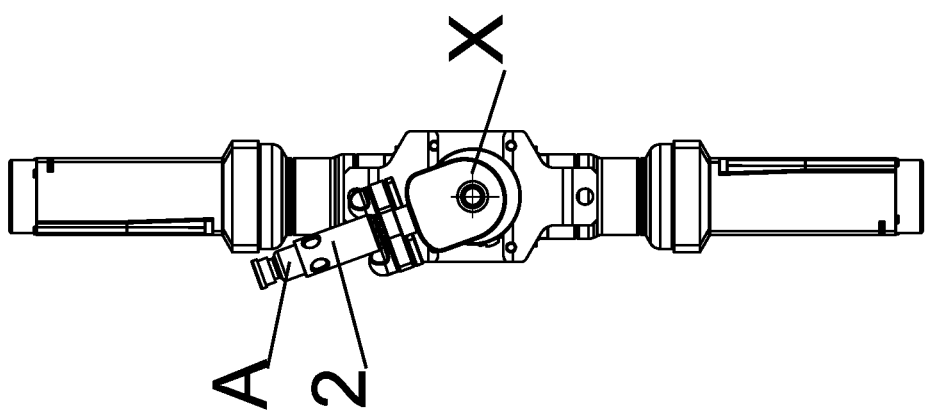

It is preferable for the guide (3) to rotate as much as possible so as to enable the depositing or pickup of the containers (A) with multiple orientations; for example, in the operating sequence visible in FIGS. 4 to 6 it is preferable for the guide (3) to be able to arrange the containers (A) at any angle with respect to the almost 180 sexagesimal degrees available in each of the chambers (11, 12).

In FIGS. 1, 21 and 22 the distances (D) are calculated between the axes of the containers (A); in the reference sector, these distances (D) are generally identical and are indicated using the term "pitch". However the distances (D) might be evaluated with reference to the outer surface of the containers (A) or on the basis of other references.

The movement means (5) are preferably activated independently of the first rotating means (4) and are more preferably configured to move the supports (2) in any position of the guide (3) comprised between the first position and the second position, including the end positions. In other words, the displacing means (5) can more preferably operate when the guide (3) is rotated into any position.

A like device (1) provides high operating flexibility as it can move the containers (A) into positions, or angles, and with different distances (D) without reciprocal influences and with variable sequences. In other words, by way of example, it is possible to change the pitch between the containers (A) and then rotate them or vice versa, or, also, carry out the pitch change between two rotations; further, the first position and the second position can be any. Again by way of example, and with reference to the description of the elements described in the following, the device (1) of FIG. 1, without the second rotating means (61) and with a main body (51) appropriately orientated, would be able to vary the distances (D); however the variations would always be the same between a first position and a second position. It would therefore be necessary to change the main body (51) to obtain different variations of the distances (D) or different first positions and second positions, with respect to variations of the distances (D).

The movement means (5) are generally configured to move the supports (2) so as to vary the distances (D) between the supports (2) by a same entity, taking account of any eventual presence of a further support (20) described in the following.

Though various embodiments of the movement means (5) are possible, for example these might comprise a grub screw with a double threading, appropriately coupled to each of the supports (2), the embodiment that will be described in the following ensures, among other things, the exposing of the surfaces that might cause cross-contamination and facilitates the positioning of seals to protect the unexposed parts.

The guide (3) preferably comprises at least a through-opening (31) which receives the supports (2) and each of the supports (2) further comprises a guide part (22) at the opposite end of the support part (21). The guide parts (22) project from the at least a through-opening (31) on the opposite side to which the support parts (21) face onto. For example, FIG. 3 illustrates how the support parts (21) and the guide parts (22) face on to opposite half-spaces with respect to a horizontal plane passing from the guide (3).

The movement means (5) comprise a main body (51) which is arranged on the side of the at least a through-opening (31) on which the guide parts (22) project and which comprises an external surface (52) on which tracks are formed (53, 54, 55, 56, 57, 58, 59, 60) for guiding the guide parts (22). While the guide parts (22) must project to engage the tracks (53, 54, 55, 56, 57, 58, 59, 60), the support parts (21) could remain internally of the at least a through-opening (31), in general however increasing the risk of cross-contamination.

The main body (51) is rotationally coupled to the guide (3) according to a respective axis of rotation (Y).

Each guide part (22) engages in a respective track (53, 54, 55, 56, 58, 59, 60) and at least some of the tracks (53, 54, 55, 56, 57, 58, 59, 60) are conformed so as to vary the position of the guide parts (22) along the direction of the axis of rotation (Y) of the main body (51) during the rotation of the main body (51) with respect to the guide (3).

It is advantageously possible to vary the distances (D) with a compact apparatus, with surfaces exposed to the flows and possibly to the sterilisation means typically used in pharmaceutical or biotechnological lines and which enables achieving high operating flexibility.

Figure 9:
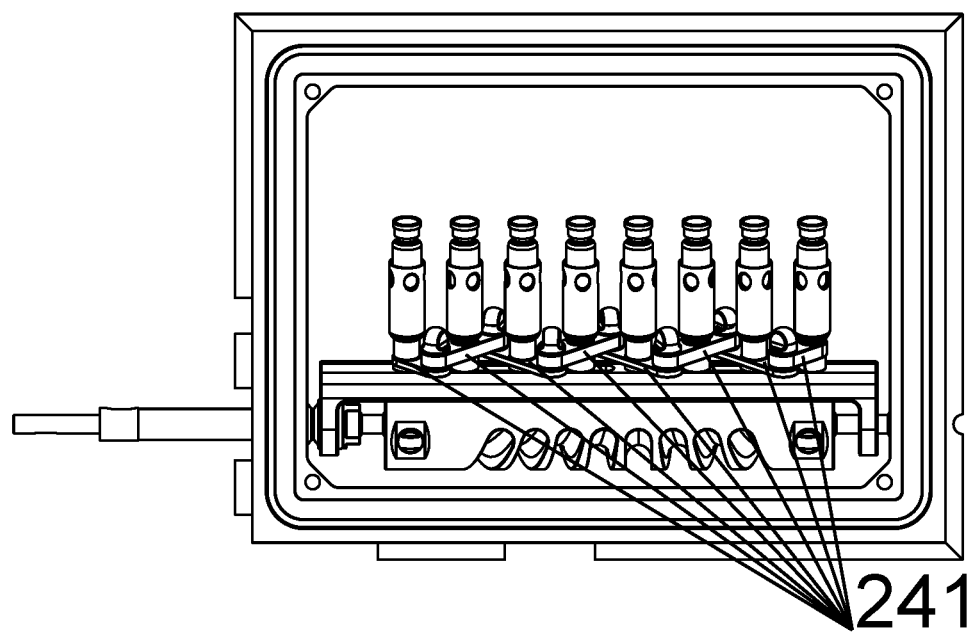
Figure 10:
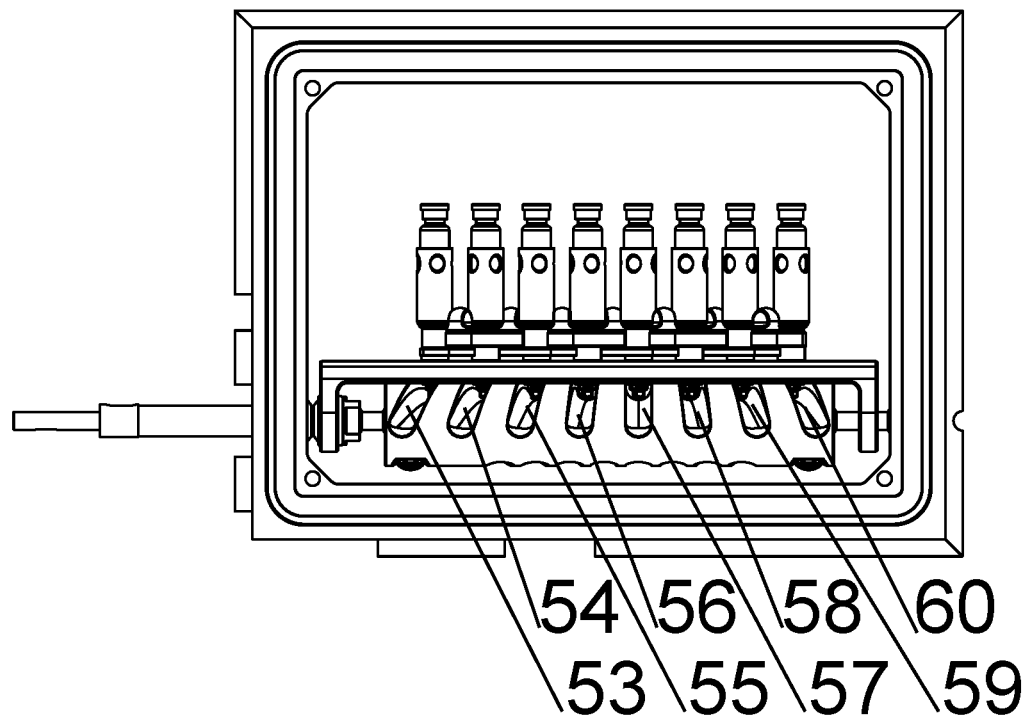
Figure 11:
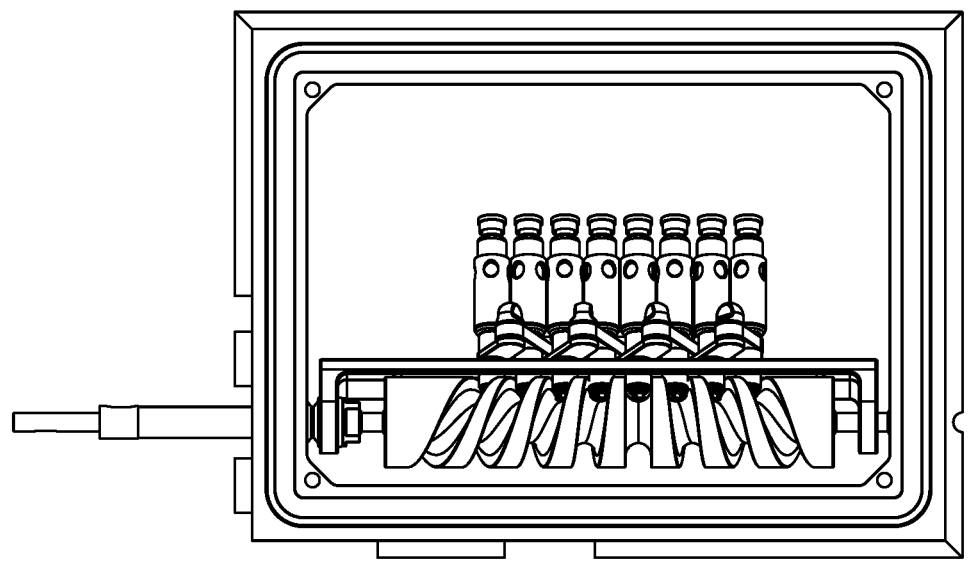

FIGS. 9, 10 and 11 illustrate the conformation of the tracks (53, 54, 55, 56, 57, 58, 59, 60) in the illustrated embodiment; especially in FIG. 11, it can be seen how the supports (2) are closer to one another due to the position of the guide parts (22) in the tracks (53, 54, 55, 56, 57, 58, 59, 60) which near one another towards these positions. More preferably the tracks (53, 54, 55, 56, 57, 58, 59, 60) are made with reliefs or dips so as not to generate areas that might retain contaminants; for example, FIG. 3 illustrates the U-profile of the dips.

The tracks (53, 54, 55, 56, 57, 58, 59, 60) can be conformed on the basis of specific requirements. Generally, especially in the case of containers (2) arranged at a predetermined pitch, one of the tracks (53, 54, 55, 56, 57, 58, 59, 60) might not vary the position of the guide parts (22) along the direction of the axis of rotation (Y) of the main body (51), i.e. might have the same section on each of the planes involved of the series of planes of the axis of rotation (Y). For example, in the embodiment of FIG. 1, the further support (20) is housed in a seat (32) with respect to which it can only rotate and the respective track (57) does not vary the position thereof, indeed could be removed, by appropriately modifying the further support (20).

The movement means (5) preferably further comprise second rotating means (61) configured to rotate the main body (51), so as to make the rotation of the containers (A) and the variation of the distances (D) between the containers (A) independent.

As already discussed in general terms, the at least a through-opening (31) preferably extends according to the direction of the axis of rotation (X) so as to guide the supports (2) along the same direction.

The axis of rotation (Y) of the main body (51) preferably coincides with the axis of rotation (X) of the guide (3), the first rotating means (4) comprise a first shaft (41), the second rotating means (61) comprise a second shaft (62) and, more preferably, the second shaft (62) is for a portion thereof inside the first shaft (41). The risk of cross-contamination is thus rendered minimal and facilitates an activation of simple management and with a reduced number of exposed elements. FIG. 3 enables observing the use of common seals for protection of the areas that it is not possible to maintain expose and the activation of the first shaft (41) and of the second shaft (62) with respective motors (43, 64), generally gear motors, and transmissions (42, 63).

The supports (2) preferably further comprise, between the support part (21) and the guide part (22), a coupling part (23) which is axial symmetric and is configured to engage the at least a through-opening (31) so as to be able to rotate with respect to the axis of symmetry thereof, i.e. in a rotating way. This rotation facilitates the exposure and possibly the sterilisation of the coupling parts (23) as it is possible to vary the orientation thereof internally of the at least a through-opening (31).

In general terms one or more containers (A) might not be moved along the guide (3); this preferably occurs for the central container (A), or one of the two central containers, in the case of containers arranged in pitch.

The device (1) can comprise a further support (20) comprising a respective support part (210) configured to accommodate a container (A) with an exposed part (B), so that it can be picked up by transport means (13, 14) of the containers (A), and the guide (3) can comprise a seat (32) which receives the further support (210). The various embodiments of the supports (2) can also be applied to the further support (20), so as not to have to manage special pieces with respect to the others. The further support (20) can therefore comprise a respective guide part (220) and a respective coupling part (230).

More preferably, the at least a through-opening (31) comprises a first through-opening (311) and a second through-opening (312), each configured to receive at least a support (2) and between which the seat (32) is arranged. It is therefore possible to maintain the containers (A) substantially centred with respect to the guide (3), regardless of the distances (D) between them.

The supports (2) and, possibly, the further support (20), preferably comprise connecting arms (241) which are configured to be connected to one another and which are connected to one another to form a part of an extensible pantograph. As visible in FIGS. 9 and 22, successive connecting arms (241) are rotationally connected to one another at the respective ends and each support (2), or further support (20), comprises one connecting arm (241) alone if at the end, and otherwise two. The connecting arms (241) advantageously oblige the supports (2) and the further support (20) to rotate in the displacement along the guide (3), thus facilitating the exposure of all the surfaces; further they can perform the function of supporting, or maintaining the position, of the supports (2).

The supports (2) preferably comprise a central part (24) which is formed in a single piece with the connecting arms (241) and which is coupled to the support part (21), at a first end, and to the guide part (22), at the opposite end to the first end. Likewise, the further support (20) can comprise a respective central part (240).

In a preferred version, advantageous also in terms of mounting, the guide part (22) is a special screw that when engaging in the central part (24) blocks the coupling part (23). By way of example, with reference to FIG. 3, the coupling part (23) is a bush in two parts, interposed between the central part (24) and the at least a through-opening (31). Again with reference to FIG. 3, it can be observed how the above-described device (1), owing also to the use of common seals in the sector, enables the passage of air and, possibly, the sterilisation of all the areas which might cause cross-contamination as these areas are in view and easily reachable.

Figure 7:
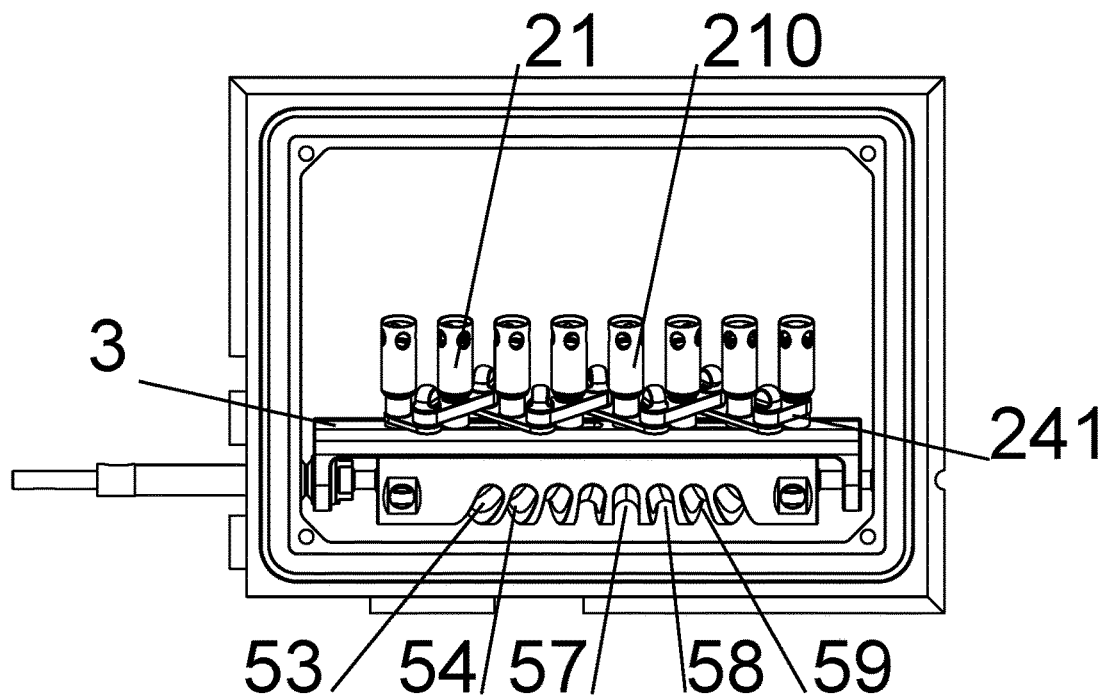
FIGS. 7 to 12 illustrate an operating sequence of the embodiment of FIG. 1 from various points of view and in some cases with some elements not included.
Figure 8:
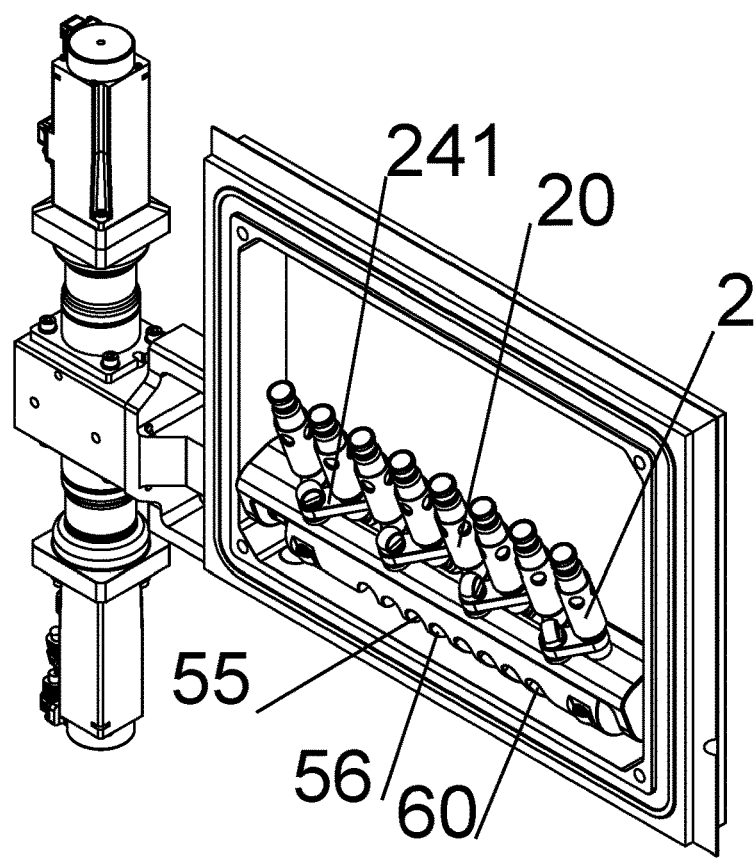
Figure 12:
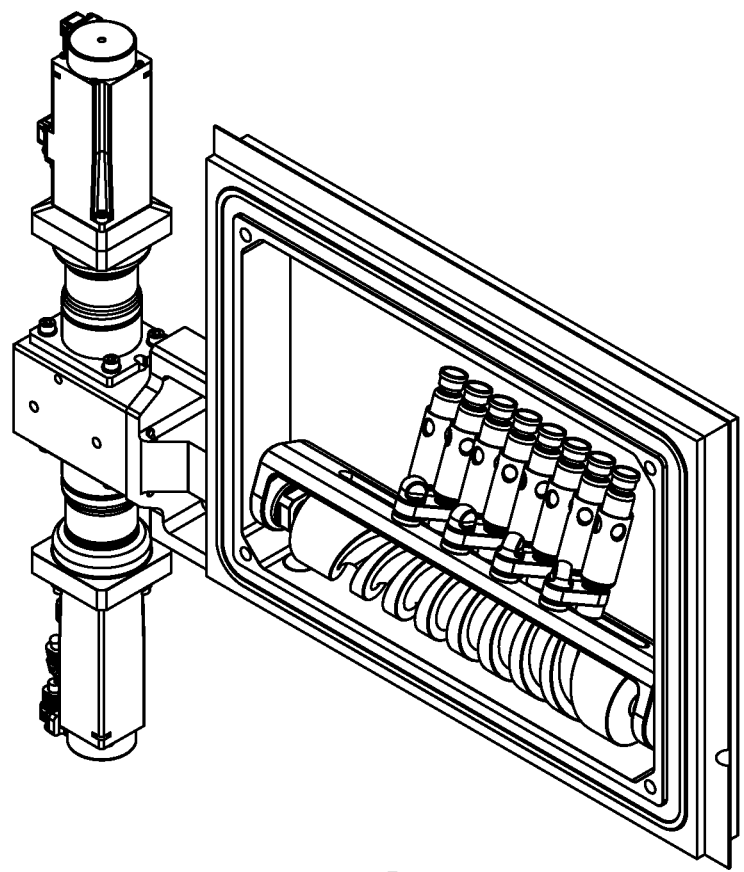
Figure 13:
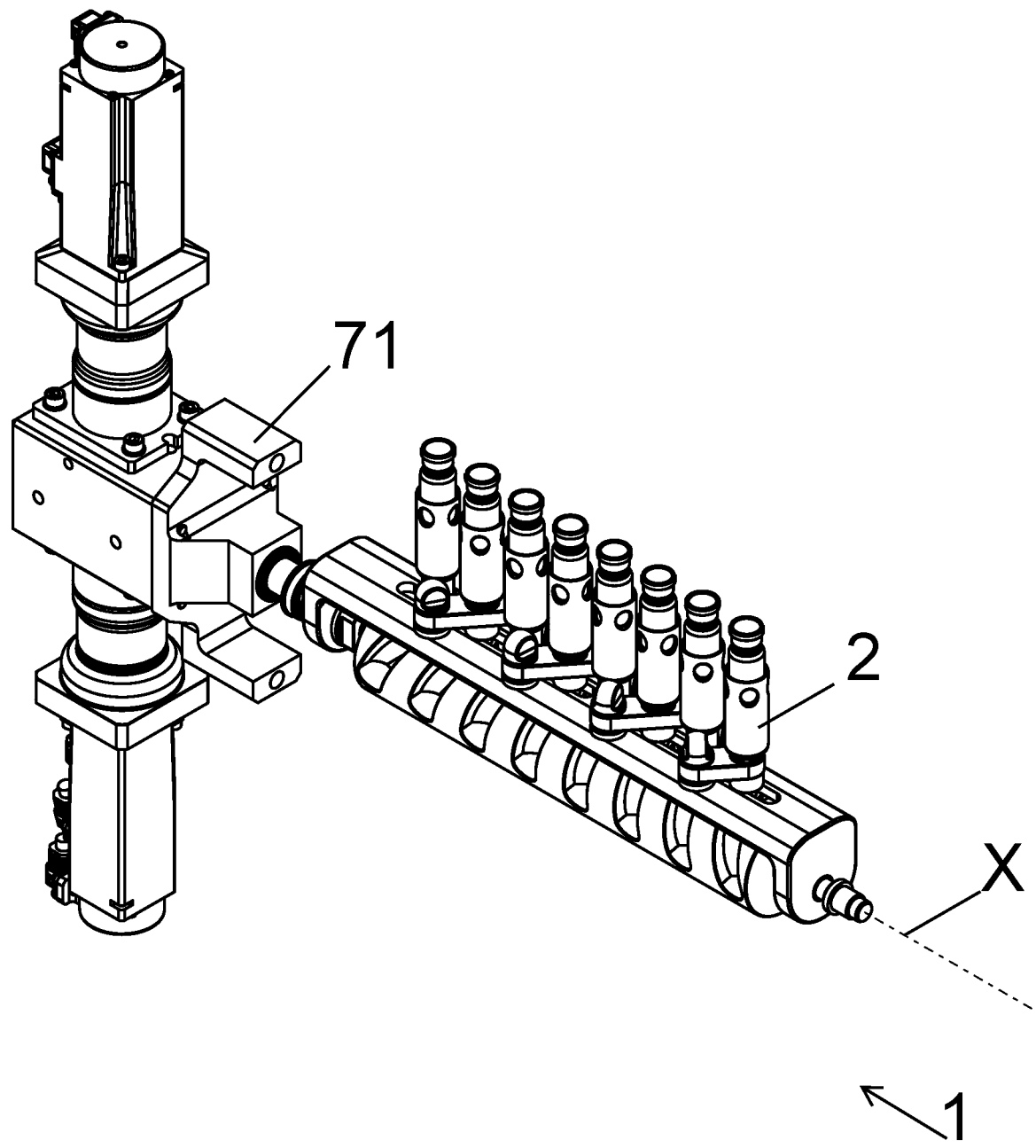
FIG. 13 illustrates a perspective view of a further embodiment of the device according to the invention.
Figure 14:
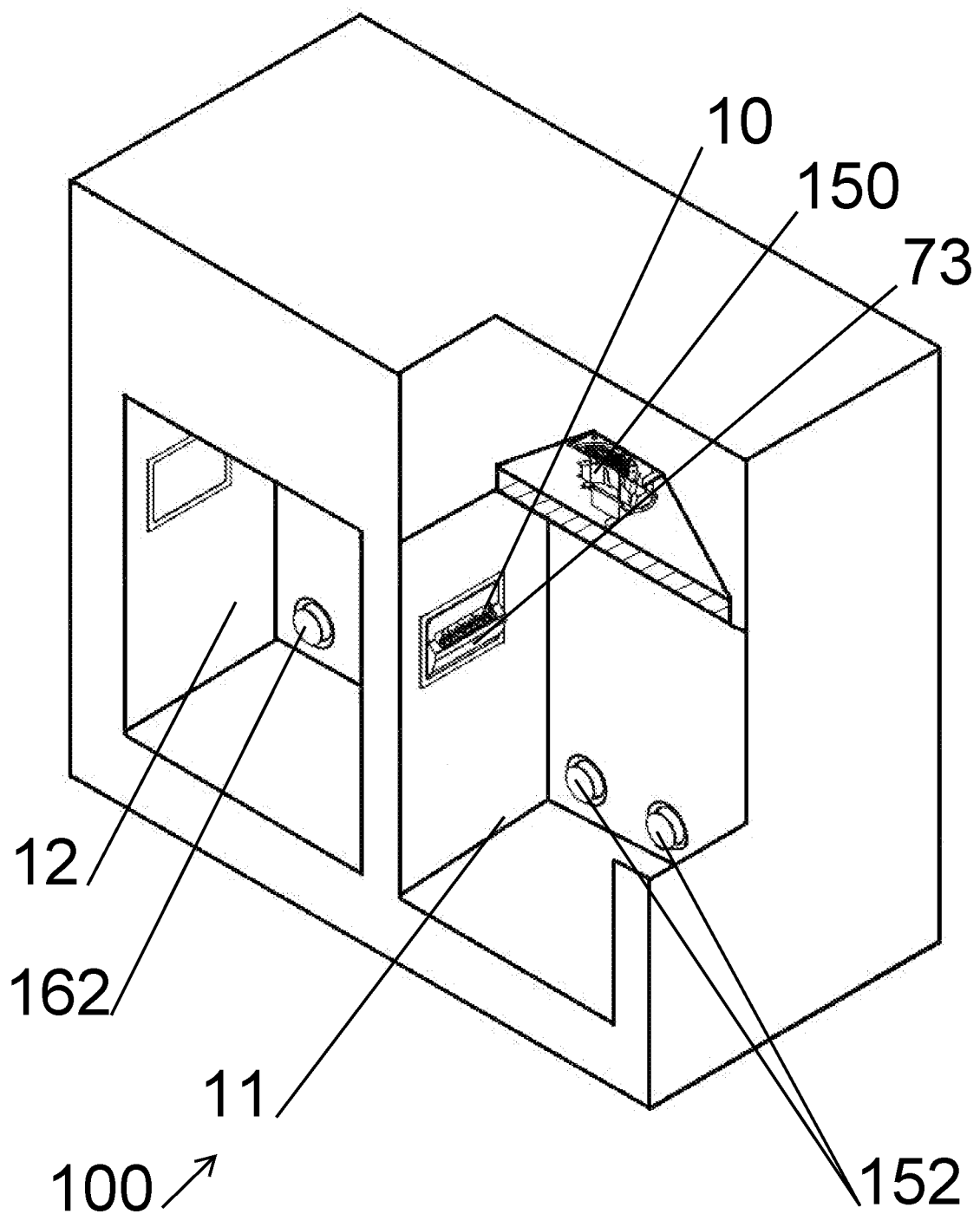
FIG. 14 illustrates a perspective view embodiment of an embodiment of the apparatus according to the invention.
Figure 15:
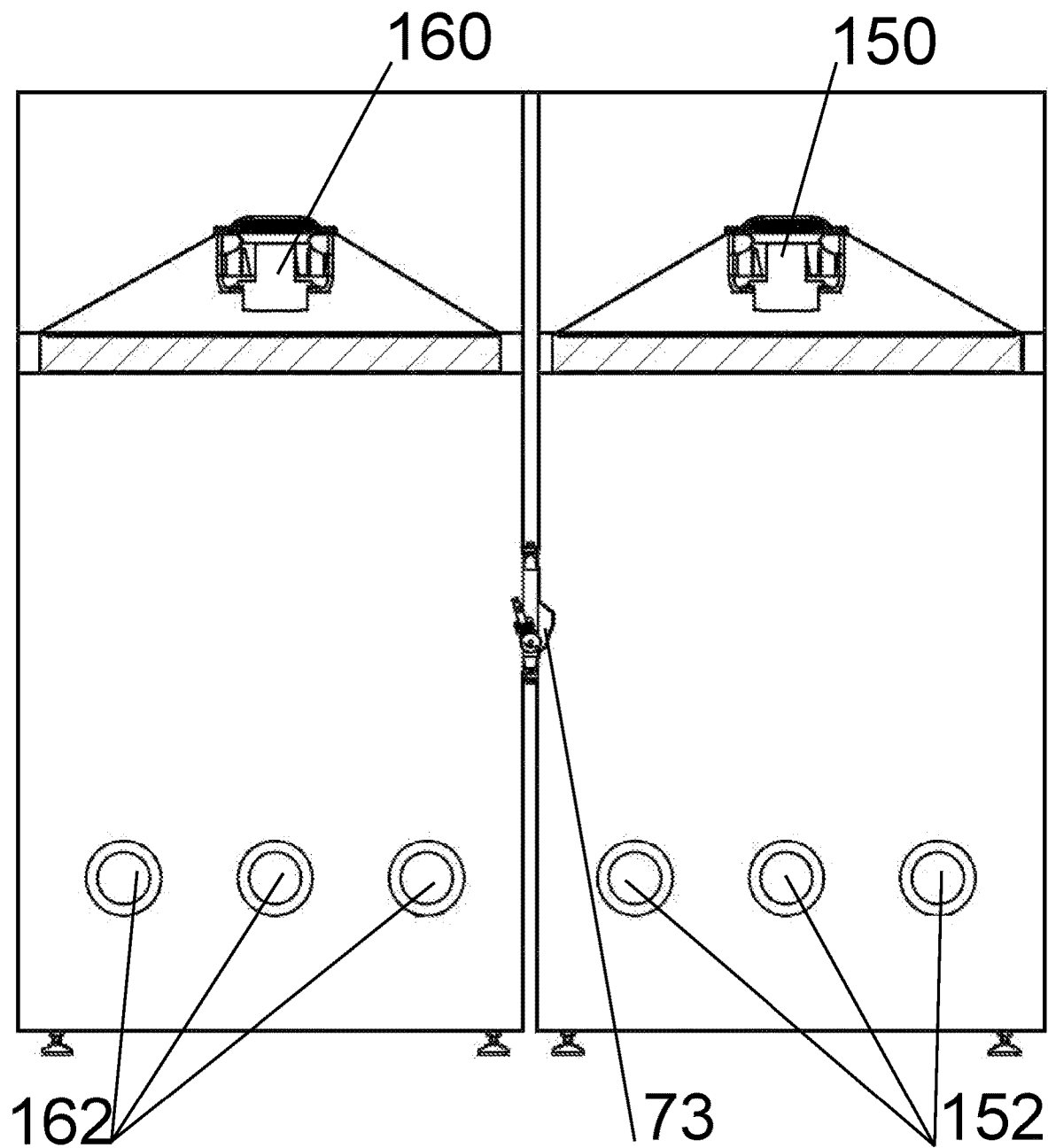
FIG. 15 illustrates a section, with respect to a plane passing through the threshold of the chambers, of the apparatus of FIG. 14.

FIGS. from 7 to 12 illustrate an operating sequence in particular:
standby for containers (A), FIG. 7;
depositing of the containers (A), FIGS. 8 and 9;
a first part of the rotation of the guide (3) and of the main body (51), FIG. 10;
completion of the rotation of the guide (3) and of the main body (51), FIGS. 11 and 12.

The device (1) is preferably configured to carry out different sequences: for example, in FIG. 10, the main body (51) might not yet have been rotated or the standby for the containers (A) might take place with the supports (2) arranged as in FIG. 10.

Figure 17:
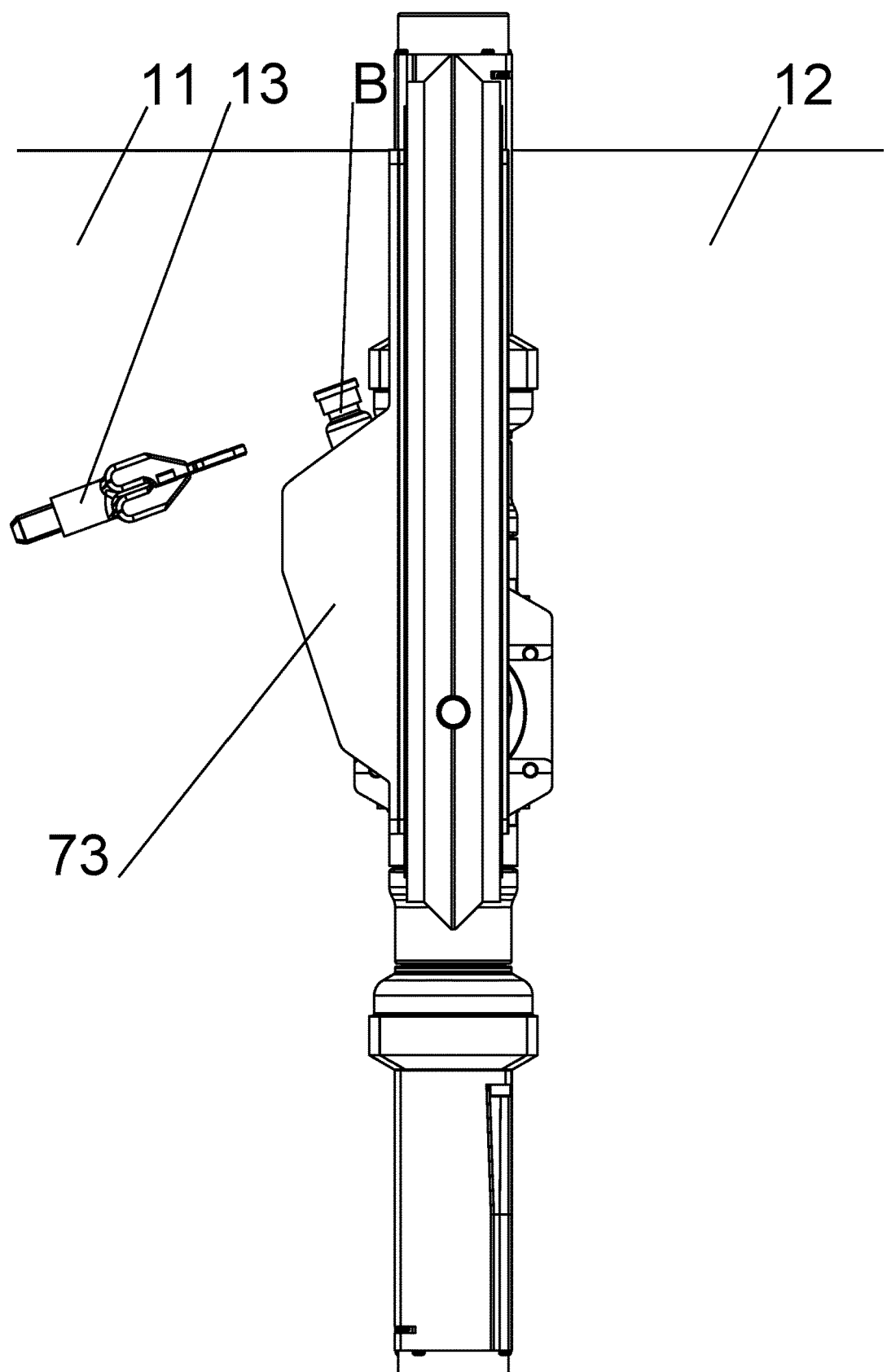
FIGS. 17 and 18 show a further embodiment of device according to the invention in two successive operating moments, as is evident from the end effectors of respective robotic systems.

The device (1) is preferably applicable internally of a production line or of a machine for automated production of pharmaceutical or biotechnological articles. For this reason the support structure (7) comprises a connecting part (71) configured to be fixed in one, between, or in both, the first chamber (11) and the second chamber (12). More preferably the device (1) is installed in an existing threshold between the first chamber (11) and the second chamber (12); for this reason the device (1) can comprise a frame (72) and/or a separating wall (73) which, alone or together, define an opening (10) for passage of containers (A). In general it is preferable for the device (1) to be complete with a frame (72) so that the installation cannot jeopardise the seal. FIGS. 19 and 20 illustrate a separating wall (73) which defines an opening (10) and which confines the device (1) internally of a chamber (11, 12). The same separating wall (73) is visible in FIGS. 17 and 18 in which an example is given of the sequence of passing to gripping organs of distinct robotic systems, i.e. with the device (1) positioned internally of a production line or of a machine.

An embodiment of the apparatus (100) for automated production of pharmaceutical or biotechnological articles according to the invention comprises a first chamber (11) with a first controlled atmosphere and a second chamber (12) with a second controlled atmosphere, an opening (10) for passage of containers (A) between the first chamber (11) and the second chamber (12), a device (1) as described in the foregoing and first transport means (13) and/or second transport means (14).

Typically the first chamber (11) and the second chamber (12) are cleanrooms, for example according to standard ISO 14644-1, and more preferably they have different pharmaceutical or biotechnological environment classification. For example and with reference to the above standard, the first chamber (11) can be class 3 and the second chamber (12) can be class 2.

The first transport means (13) are arranged internally of the first chamber (11) and are configured to transport containers (A) so as to deposit or pick up containers (A) on the supports (2) of the device (1). Likewise, the second transport means (14) are arranged internally of the second chamber (12) and are configured to transport containers (A) so as to deposit or pick up containers (A) on the supports (2) of the device (1). The advantages of the invention also emerge when the transport means (13, 14) are arranged only on one side because, for example, in the second chamber (12) the containers (A) are not picked up.

The support structure (7) of the device (1) advantageously arranges the axis of rotation (X) of the guide (3) at or in proximity of the opening (10) so that the rotation of the first rotating means (4) brings the supports (2) from a first position, in which the supports (2) face towards the first chamber (11), to a second position in which the supports (2) face towards the second chamber (12), so as to locate, at least partially, the exposed part (B) of each of the containers (A) respectively in the first chamber (11) and in the second chamber (12).

The above-discussed advantages are obtained in this way. The first transport means (13) and second transport means (14) are preferably configured so as not to invade, respectively, the second chamber (12) and the first chamber (11) when depositing or picking up containers (A) on the supports (2) of the device (1).

Generally the transport means (13, 14) comprise robotic systems, not shown in FIGS. from 14 to 16, and of which the end effectors are visible in other figures; an example of robotic systems is described in US 2019315004 A1.

The first transport means (13) of the containers (A) preferably comprise a first robotic system arranged internally of the first chamber (11) and the second transport means (14) of the containers (A) comprise a second robotic system arranged internally of the second chamber (12).

As illustrated in the foregoing, preferably though not necessarily the axis of rotation (X) is arranged at a threshold between the first chamber (11) and the second chamber (12), for example on a vertical plane which divides the threshold in half.

The apparatus (100) preferably comprises first ventilation and cleaning means, second ventilation and cleaning means and, more preferably, deflecting means.

The first ventilation and cleaning means are configured to clean the air and generate, in the first chamber (11), a first laminar flow (151) of air directed towards at least a first outlet mouth (152) from the first chamber (11).

The second ventilation and cleaning means are configured to clean the air and generate, in the second chamber (12), a second laminar flow (161) of air directed towards at least a second outlet mouth (162) from the second chamber (12).

Figure 16:
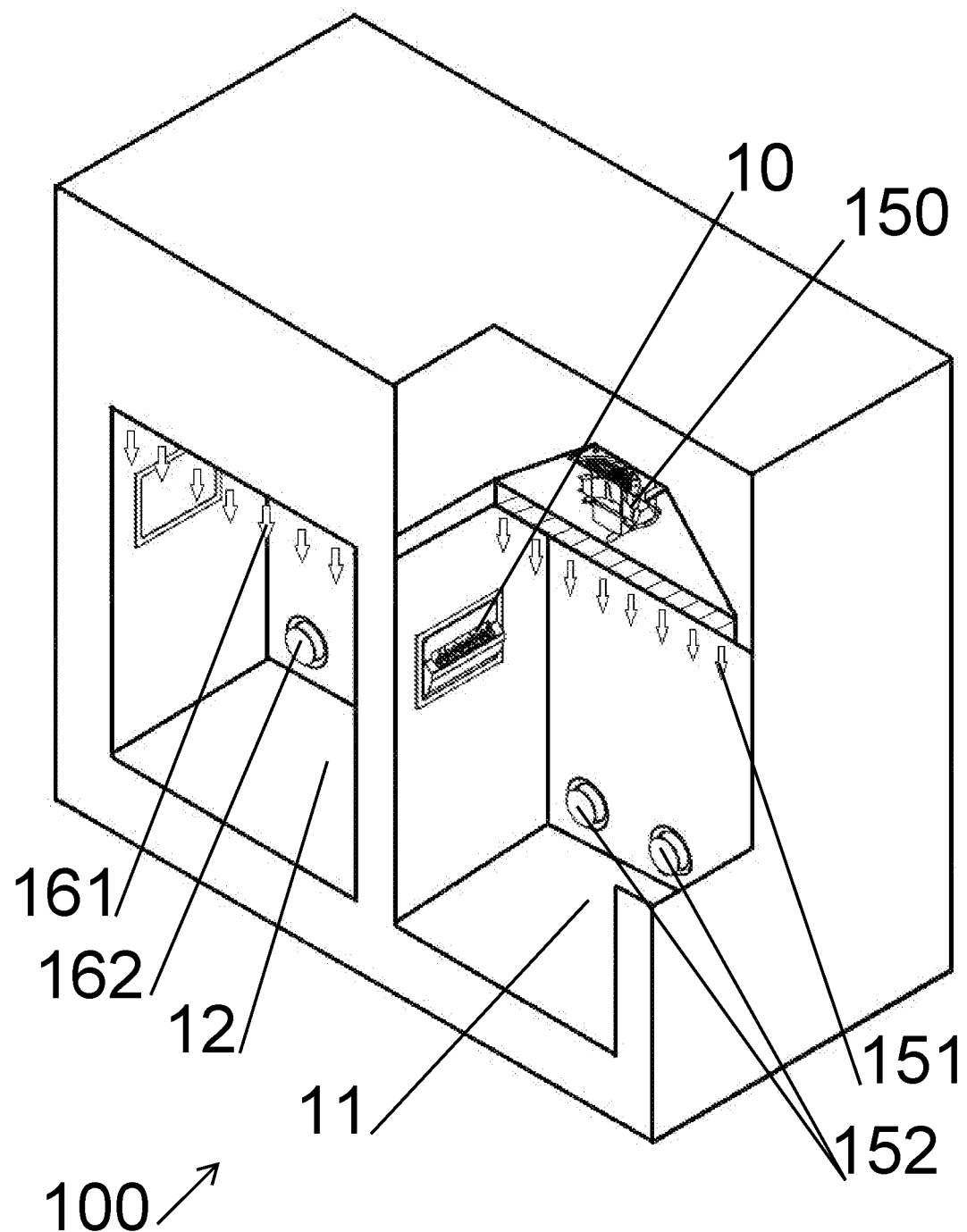
FIG. 16 illustrates a perspective view of a further embodiment of the apparatus according to the invention.

In FIG. 16 the arrows indicate the direction of the first laminar flow (151) and the second laminar flow (161). In a common practice, the first and second ventilation and cleaning means comprise filters and, respectively, a first ventilator (150) and a second ventilator (160), the latter being visible in FIGS. from 14 to 16.

The deflecting means are configured for deflecting a part of the first laminar flow (151) towards the at least a second outlet mouth (162) from the second chamber (12).

The device (1) is advantageously arranged with respect to the deflecting means in such a way that the parts exposed to the first laminar flow (151) are exposed to the part of the first laminar flow (151) deflected towards the at least a second outlet mouth (162). The teaching can be applied to any one of the chambers (11, 12) of the isolator visible in FIG. 16 among which, in general, there is a pressure difference which deviates a small part of one of the laminar flows towards the other chamber (11, 12).

The second chamber (12) is preferably placed under depression with respect to the first chamber (11), i.e. the first chamber (11) is placed in positive pressure; by way of indication, according to common practice the pressure difference is between ten and twenty Pascal. Alternatively or in combination, the deflecting means comprise a separating wall (73) which, more preferably, also defines the opening (10). As is visible, for example, in FIGS. from 17 to 20, the separating wall (73) is arranged in the first chamber (11).

The apparatus (100) preferably comprises one or more isolators.

The invention also refers to a method for producing pharmaceutical or biotechnological articles which, in an embodiment, comprises steps of:

prov014ing an apparatus (100) comprising a first chamber (11) with a first controlled atmosphere, a second chamber (12) with a second controlled atmosphere, an opening (10) for passage of containers (A) between the first chamber (11) and the second chamber (12), first transport means (13) of the containers (A) comprising a first robotic system arranged internally of the first chamber (11), second transport means (14) of the containers (A) comprising a second robotic system arranged internally of the second chamber (12) and supports (2) comprising support parts (21), configured to accommodate a container (A) with an exposed part (B) so that it can be picked up by transport means (13, 14) of the containers (A), and rotationally movable with respect to the opening (10) according to an axis of rotation (X) so as to rotate between a first position in which the supports (2) face towards the first chamber (11) to a second position in which the supports (2) face towards the second chamber (12) thus locating, at least partially, the exposed part (B) of each of the containers (A) respectively in the first chamber (11) and in the second chamber (12);

introducing containers (A), preferably primary containers, into the first chamber (11);

depositing a group of containers (A) introduced on the supports (2) by the first robotic system so that it does not invade the second chamber (12);

rotating the supports (2) towards the second chamber (12) so that the exposed part (B) of each container (A) can be picked up by the second robotic system without invading the first chamber (11);

picking up the group of containers (A) from the supports (2) by means of the second robotic system in such a way that it does not invade the first chamber (11);

filling the group of containers (A) with pharmaceutical or biotechnological material.

In general the robotic system of the apparatus (100) is an anthropomorphic robot which comprises gripping organs, such as for example pliers, configured for the containers (A) in use.

The method is preferably applied using the apparatus (100) described in the foregoing; in this case in the step of supplying an apparatus (100) according to the invention is provided and the method comprises steps of:

introducing containers (A) into the first chamber (11);

depositing a group of containers (A) introduced on the supports (2) by the first transport means (13) so that they do not invade the second chamber (12);

rotating the supports (2) towards the second chamber (12) so that the exposed part (B) of each container (A) can be picked up by the second transport means (14) without invading the first chamber (11);

picking up the group of containers (A) from the supports (2) by means of the second transport means (14) so that they do not invade the first chamber (11);

filling the group of containers (A) with pharmaceutical or biotechnological material.

It is also preferable that during the step of rotating the supports (2), the distances (D) between the containers (A) are varied by moving support parts (21) towards or away from one another.

The containers (A) are usually arranged in a plurality of rows with the same pitch in each row; more preferably, the distances (D) are varied in equal measure.

In general the containers (A) are provided appropriately arranged inside secondary containers, such as for example drawers or trays provided with appropriate housings so as to keep them ordered. The syringes or bottles are typically supported by an element known as a nest which is positioned inside another element known as a tub. However the dimensions of the containers (A) and the distances (D) frequently vary, often from batch to batch.

The method is especially flexible in managing containers (A) supplied having different characteristics if it is possible to replace the support parts (21) according to the dimensions thereof and the end effectors of the robotic systems involved according to the dimensions and the distances (D) thereof between the containers (A), if necessary. FIGS. 1 and 2 and FIGS. 21 and 22 illustrate different end effectors for picking up or depositing containers (A) of different dimensions. For the same reason the support parts (21) illustrated in the figures have different diameters.

For these reasons a preferred embodiment of the method, during the step of supplying containers (A), primary containers of predetermined dimensions are supplied arranged in a plurality of rows having a same distance (D), or predetermined pitch, among the containers (A) of each row, further comprise steps of:
providing the first transport means (13) of a collecting organ configured to collect a group of containers (A) of the predetermined dimensions and arranged in a row at the predetermined pitch;
providing the supports (2) of support parts (21) configured to accommodate containers (A) of the predetermined dimensions;
supplying a guide (3) for guiding the supports (2), of a linear type, and movement means (5) to move the supports (2) along the guide (3) so as to vary the distances (D) between the supports according to the direction of the axis of rotation (X).

During the step of depositing a group of containers (A), containers (A) of a same row are advantageously deposited and during the step of rotating the supports (2), the distances (D) between the containers (A) are varied in equal measure by moving support parts (21) towards or away from one another.

During the step of supplying containers (A), vials, bottles, syringes or cartridges are preferably supplied and each container (A) comprises a mouth for introducing pharmaceutical or biotechnological material and during the step of rotating the supports (2) the containers are maintained so as to have the mouth facing upwards, so as to simplify the production operations.

More preferably, during the step of rotating the supports (2), the supports (2) are rotated so as to form angles of an equal size with respect to a horizontal plane in the initial position and in the final position, as visible in FIGS. 4 and 6.

The method, as well as the apparatus (100), preferably comprises a filling step or filling means of the containers (A) and/or a closing step or closing means or capping thereof. Other typical operations are washing, sterilisation and inspection.

It is understood that the above has been described by way of non-limiting example and that any constructional variants are considered to fall within the protective scope of the present technical solution, as claimed in the following.

The invention claimed is:

1. A device for moving a group of containers for pharmaceutical or biotechnological use, between a first chamber with a first controlled atmosphere and a second chamber with a second controlled atmosphere in at least one of which transport means of the containers operate, comprising:
a support structure;
supports, each comprising a support part configured to accommodate a container with an exposed part so that it can be picked up by transport means of the containers;
a guide which is configured to guide the supports, which is rotationally coupled to the support structure with respect to an axis of rotation so as to rotate between a first position and a second position and which receives the supports orientated in such a way that the support parts are facing towards a first zone in the first position and towards a second zone in the second position so as to locate, at least partially, the exposed part of each of the containers respectively in a first chamber with a first controlled atmosphere and in a second chamber with a second controlled atmosphere;
first rotating means configured to rotate the guide with respect to the axis of rotation;
movement means configured to move the supports along the guide so as to vary the distances between the supports according to the direction of the axis of rotation, wherein:
the guide comprises at least a through-opening which receives the supports;
each of the supports further comprises a guide part at the opposite end of the support part, the guide parts projecting from the at least a through-opening on the opposite side to which the support parts face onto;
the movement means comprise a main body, rotationally coupled to the guide according to a respective axis of rotation, and second rotating means configured to rotate the main body, the main body being arranged on the side of the at least a through-opening on which the guide parts project and comprising an external surface on which tracks are made to guide the guide parts;
each guide part engages in a respective track;
at least some of the tracks are conformed so as to vary the position of the guide parts along the direction of the axis of rotation of the main body during the rotation of the main body with respect to the guide.

2. The device of claim 1, wherein the movement means are activated independently of the first rotating means and are configured to move the supports in any position of the guide comprised between the first position and the second position, including the first position and the second position.

3. The device of claim 1, wherein the axis of rotation of the main body coincides with the axis of rotation of the guide, wherein the first rotating means comprise a first shaft, wherein the second rotating means comprise a second shaft and wherein the second shaft is for a portion thereof inside the first shaft.

4. The device of claim 1, wherein the at least a through-opening extends according to the direction of the axis of rotation so as to guide the supports along the same direction and wherein the supports further comprise, between the support part and the guide part, a coupling part which is axial symmetric and is configured to engage the at least a through-opening so as to be able to rotate with respect to the axis of symmetry thereof.

5. The device of claim 1, comprising a further support which comprises a respective support part configured to accommodate a container with an exposed part so that the container can be picked up by transport means of the containers, wherein the guide comprises a seat which receives the further support and wherein the at least a through-opening comprises a first through-opening and a second through-opening, each configured to receive at least a support and between which the seat is arranged.

6. The device of claim 5, wherein the supports and the further support comprise connecting arms which are configured to be connected to one another and which are connected to one another to form a part of an extensible pantograph.

7. The device of claim 1, wherein the support parts comprise a part shaped as a basin or beaker to support and retain the containers during the rotation of the guide.

8. An apparatus for automated production of pharmaceutical or biotechnological articles comprising:
   a device for moving a group of containers for pharmaceutical or biotechnological use, between a first chamber with a first controlled atmosphere and a second chamber with a second controlled atmosphere in at least one of which transport means of the containers operate, comprising:
      a support structure;
      supports, each comprising a support part configured to accommodate a container with an exposed part so that it can be picked up by transport means of the containers;
      a guide which is configured to guide the supports, which is rotationally coupled to the support structure with respect to an axis of rotation so as to rotate between a first position and a second position and which receives the supports orientated in such a way that the support parts are facing towards a first zone in the first position and towards a second zone in the second position so as to locate, at least partially, the exposed part of each of the containers respectively in a first chamber with a first controlled atmosphere and in a second chamber with a second controlled atmosphere;
      first rotating means configured to rotate the guide with respect to the axis of rotation;
      movement means configured to move the supports along the guide so as to vary the distances between the supports according to the direction of the axis of rotation;
   a first chamber with a first controlled atmosphere;
   a second chamber with a second controlled atmosphere;
   an opening for passage of containers between the first chamber and the second chamber;
   first transport means arranged internally of the first chamber and configured to transport containers so as to deposit or pick up containers on the supports of the device and/or second transport means arranged internally of the second chamber and configured to transport containers so as to deposit or pick up containers on the supports of the device;
   wherein the support structure arranges the axis of rotation of the guide at or in proximity of the opening so that the rotation of the first rotating means brings the supports from a first position, in which the supports face towards the first chamber, to a second position in which the supports face towards the second chamber, so as to locate, at least partially, the exposed part of each of the containers respectively in the first chamber and in the second chamber.

9. The apparatus of claim 8, comprising:
   first ventilation and cleaning means, configured to clean the air and generate, in the first chamber, a first laminar flow of air directed towards at least a first outlet mouth from the first chamber;
   second ventilation and cleaning means, configured to clean the air and generate, in the second chamber, a second laminar flow of air directed towards at least a second outlet mouth from the second chamber;
   deflecting means for deflecting a part of the first laminar flow towards the at least a second outlet mouth from the second chamber;
   wherein the device is arranged with respect to the deflecting means in such a way that parts exposed to the first laminar flow are exposed to the part of the first laminar flow deflected towards the at least a second outlet mouth.

10. The apparatus of claim 8, comprising first transport means and second transport means configured so as not to invade, respectively, the second chamber and the first chamber when depositing or picking up containers on the supports of the device.

11. The apparatus of claim 8, wherein the first transport means of the containers comprise a first robotic system arranged internally of the first chamber and the second transport means of the containers comprise a second robotic system arranged internally of the second chamber.

12. A method for producing pharmaceutical or biotechnological articles comprising steps of:
   providing an apparatus according to claim 8;
   introducing containers into the first chamber;
   depositing a group of containers introduced on the supports by the first transport means in such a way that they do not invade the second chamber;
   rotating the supports towards the second chamber so that the exposed part of each container can be picked up by the second transport means without invading the first chamber;
   picking up the group of containers from the supports by means of the second transport means so that they do not invade the first chamber;
   filling the group of containers with pharmaceutical or biotechnological material.

13. The method of claim 12, wherein during the step of introducing containers, primary containers of predetermined dimensions are supplied arranged in a plurality of rows having a same distance, or predetermined pitch, among the containers of each row, the method further comprising steps of:
   providing the first transport means of a collecting organ configured to collect a group of containers of the predetermined dimensions and arranged in a row at the predetermined pitch;
   providing the supports of support parts configured to accommodate containers of the predetermined dimensions;
   supplying a guide for guiding the supports, of a linear type, and movement means to move the supports along the guide so as to vary the distances between the supports according to the direction of the axis of rotation;
   wherein:
   during the step of depositing a group of containers, containers of a same row are deposited;
   during the step of rotating the supports, the distances between the containers are varied in equal measure by moving support parts towards or away from one another.

14. The method of claim 12, wherein:
during the step of introducing containers, vials, bottles, syringes or cartridges are supplied and each container comprises a mouth for introducing pharmaceutical or biotechnological material;
during the step of rotating the supports the containers are maintained so as to have the mouth facing upwards and the supports are rotated so as to form angles of an equal size with respect to a horizontal plane in the initial position and in the final position.

15. A method for producing pharmaceutical or biotechnological articles comprising steps of:
providing an apparatus comprising a first chamber with a first controlled atmosphere, a second chamber with a second controlled atmosphere, an opening for passage of containers between the first chamber and the second chamber, first transport means of the containers comprising a first robotic system arranged internally of the first chamber, second transport means of the containers comprising a second robotic system arranged internally of the second chamber and supports comprising support parts, each configured to accommodate a container with an exposed part so that the container can be picked up by the first transport means of the containers and by the second transport means of the containers, and rotationally movable with respect to the opening according to an axis of rotation so as to rotate between a first position in which the supports face towards the first chamber to a second position in which the supports face towards the second chamber thus locating, at least partially, the exposed part of each of the containers respectively in the first chamber and in the second chamber;
introducing containers into the first chamber;
depositing a group of containers introduced on the supports by the first robotic system so that the first robotic system does not invade the second chamber;
rotating the supports towards the second chamber so that the exposed part of each container can be picked up by the second robotic system without invading the first chamber;
picking up the group of containers from the supports by means of the second robotic system in such a way that the second robotic system does not invade the first chamber;
filling the group of containers with pharmaceutical or biotechnological material.

16. The method of claim 15, wherein during the step of introducing containers, primary containers of predetermined dimensions are supplied arranged in a plurality of rows having a same distance, or predetermined pitch, among the containers of each row, the method further comprising steps of:
providing the first transport means of a collecting organ configured to collect a group of containers of the predetermined dimensions and arranged in a row at the predetermined pitch;
providing the supports of support parts configured to accommodate containers of the predetermined dimensions;
supplying a guide for guiding the supports, of a linear type, and movement means to move the supports along the guide so as to vary the distances between the supports according to the direction of the axis of rotation;
wherein:
during the step of depositing a group of containers, containers of a same row are deposited;
during the step of rotating the supports, the distances between the containers are vaned in equal measure by moving support parts towards or away from one another.

17. The method of claim 15, wherein:
during the step of introducing containers, vials, bottles, syringes or cartridges are supplied and each container comprises a mouth for introducing pharmaceutical or biotechnological material;
during the step of rotating the supports the containers are maintained so as to have the mouth facing upwards and the supports are rotated so as to form angles of an equal size with respect to a horizontal plane in the initial position and in the final position.

* * * * *